United States Patent
Ooiwa

(10) Patent No.: US 7,105,960 B2
(45) Date of Patent: Sep. 12, 2006

(54) GENERATOR MOUNTABLE TO VEHICLE

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/062,922

(22) Filed: Feb. 23, 2005

(65) Prior Publication Data

US 2005/0184604 A1 Aug. 25, 2005

(30) Foreign Application Priority Data

Feb. 24, 2004 (JP) ............................. 2004-047763

(51) Int. Cl.
*H02K 9/06* (2006.01)
*H02K 5/00* (2006.01)

(52) U.S. Cl. .......................................... 310/58; 310/89

(58) Field of Classification Search ................ 310/263, 310/89, 58, 59, 60, 60 A, 61–62
See application file for complete search history.

(56) References Cited

U.S. PATENT DOCUMENTS

| | | | | |
|---|---|---|---|---|
| 3,610,975 A | * | 10/1971 | Onjanow | 310/57 |
| 3,749,949 A | * | 7/1973 | Muller | 310/59 |
| 4,418,295 A | * | 11/1983 | Shiga | 310/59 |
| 5,021,696 A | * | 6/1991 | Nelson | 310/62 |
| 5,194,770 A | * | 3/1993 | Yoshioka et al. | 310/51 |
| 6,426,580 B1 | * | 7/2002 | Ikeda et al. | 310/263 |
| 6,448,687 B1 | | 9/2002 | Higashino et al. | |
| 6,522,046 B1 | * | 2/2003 | Ikeda et al. | 310/263 |
| 6,531,803 B1 | * | 3/2003 | Kometani et al. | 310/263 |
| 6,633,098 B1 | | 10/2003 | Inaba et al. | |
| 6,731,036 B1 | * | 5/2004 | Ghiotto | 310/89 |
| 2001/0030487 A1 | | 10/2001 | Higashino et al. | |
| 2003/0042806 A1 | | 3/2003 | Inaba et al. | |

FOREIGN PATENT DOCUMENTS

| | | |
|---|---|---|
| EP | 0 753 930 B1 | 11/1999 |
| FR | 2 736 770 A1 | 1/1997 |

* cited by examiner

*Primary Examiner*—Tran Nguyen
(74) *Attorney, Agent, or Firm*—Oliff & Berridge, PLC

(57) ABSTRACT

A generator includes a case for accommodating a stator, a rotor and a fan. The case includes two end walls in an axial direction and a peripheral side wall. The case has plural axial opening portions which are provided in at least one of the two end walls and open approximately in the axial direction, and plural radial opening portions provided in the peripheral side wall. The fan is disposed at least at one axial end of the rotor to draw outside air through the axial opening portions and to discharge the drawn outside air through the radial opening portions. A cover member of the generator covers the axial opening portions from an outside of the case with clearances between the axial opening portions and the case. Accordingly, noise generated inside the case can be reflected by the cover member, and it can effectively reduce noise transmitted to an outside.

19 Claims, 4 Drawing Sheets

GENERATOR MOUNTABLE TO VEHICLE

CROSS REFERENCE TO RELATED APPLICATION

This application is based on Japanese Patent Application No. 2004-14 047763 filed on Feb. 24, 2004, the disclosure of which is incorporated herein by reference in its entirety.

FIELD OF THE INVENTION

The present invention relates to a generator (e.g., an alternator) that is mountable to a vehicle, and to a mounting method for mounting the generator to the vehicle.

BACKGROUND OF THE INVENTION

A generator (e.g., an alternator) is generally mounted on a vehicle to supply electrical power to electrical equipment of the vehicle. Components for constructing the alternator, such as an armature coil, a field coil, a commutator and a regulator, generate heat when electrical power is supplied thereto. Accordingly, outside air is forcibly circulated by a fan to an interior of the alternator to cool heat-generating members of the alternator. However, when the outside air is forcibly circulated to the interior of the alternator, noise due to air flow is generated. If the circulation amount of the outside air in the generator increases in accordance with an increase of electrical power consumed in the electrical components of the generator, the noise due to air flow increases and may be transmitted to (i.e., audible in) a vehicle passenger compartment. In this case, unpleasant feeling due to the noise may be given to a passenger in the passenger compartment.

In order to reduce the noise, in an alternator described in U.S. Pat. No. 6,633,098 (corresponding to JP-A-2002-186215), cooling water is circulated to a case that accommodates heat generating members or a fan. However, in this case, an additional cooling structure using the cooling water is required, and structure of the alternator becomes complicated.

Alternatively, in an alternator described in U.S. Pat. No. 6,448,687 (corresponding to JP-A-2001-298921), an interior structure for accommodating fans and armature coils is changed so as to reduce the noise due to air flow. However, it is generally difficult to change the interior structure of the alternator in order to only reduce the noise due to air flow.

SUMMARY OF THE INVENTION

In view of the above-described problems, it is a first object of the present invention to provide a generator which can effectively reduce noise transmitted to an outside of the generator.

It is a second object of the present invention to provide a generator mountable to a vehicle, which can effectively reduce noise that is transmitted to a passenger compartment without changing an interior structure of the generator.

It is a third object of the present invention to provide a mounting method for mounting a generator to a vehicle.

According to an aspect of the present invention, a generator includes a case for accommodating at least a stator, a rotor and a fan. The case includes two end walls in an axial direction and a peripheral side wall connected to the two end walls. Furthermore, the case has a plurality of first opening portions that are provided in at least one of the two end walls and open approximately in the axial direction, and a plurality of second opening portions which are provided in the peripheral side wall and open approximately in a radial direction that is perpendicular to the axial direction. The stator having an armature coil wound thereon is disposed in the case coaxially with the axial direction of the case, the rotor is rotatably supported at an inner peripheral side of the stator, and the fan is disposed at one axial end portion of the rotor and rotates together with the rotor to draw outside air through the first opening portions and to discharge the drawn outside air to an outside of the case through the second opening portions. In the generator, a cover member is disposed to cover the first opening portions from an outside of the case with clearances between the cover member and the case.

Accordingly, by operating the fan, outside air is drawn to an interior of the case through the clearances and the first opening portions, and is discharged to an outside through the second opening portions after cooling heat-generating members of the generator, such as the stator and the rotor. Because the first opening portions are partially covered by the cover member, noise generated in the interior of the case is reflected by the cover member, and is difficult to be transmitted to an exterior of the case. Thus, if the generator is mounted on the vehicle, it can restrict an unpleasant feeling due to noise being given to a passenger in a passenger compartment of the vehicle.

As an example, another fan can be disposed at the other axial end portion of the rotor and can rotate together with the rotor to draw outside air through the first opening portions and to discharge the drawn outside air through the second opening portions. In this case, the first opening portions are provided in the two end walls, and are open approximately in the axial direction.

Preferably, the cover member extends from an outer surface of the case to an outside, so as to partially cover the first opening portions. Furthermore, the cover member can include a plurality of cover portions each of which is arranged to cover at least one of the first opening portions.

More preferably, the cover member covers the first opening portions with a covered area that is not smaller than 50 percent and is not larger than 90 percent of a total area of the first opening portions. Still more preferably, in each of the first opening portions, the covered area is not smaller than 50 percent and is not larger than 90 percent of the area of each first opening portion. In this case, the noise transmitted to the exterior of the case can be effectively reduced while cooling capacity due to the circulation of the outside air can be improved.

Generally, the generator further includes a pulley which is disposed outside of one end wall of the case and is rotatable coaxially with the rotor at one end of the rotor, and a belt through which a rotation torque of a crank shaft is transmitted to the pulley. In this case, the cover member arranged at a side of the one end wall of the case can be provided with a removed portion that is removed to prevent contact with the belt. Therefore, noise due to contact between the cover member and the belt can be prevented.

According to another aspect of the present invention, the case is disposed in a vehicle such that the axial direction is oriented in a vertical direction. As an example, the generator is mountable to a vehicle such that the first opening portions provided at one end wall of the case are opened toward an upper side.

BRIEF DESCRIPTION OF THE DRAWINGS

The above and other objects, features and advantages of the present invention will become more apparent from the following detailed description of exemplary embodiments made with reference to the accompanying drawings, in which.

DETAILED DESCRIPTION OF PREFERRED EMBODIMENT

Figure 1:
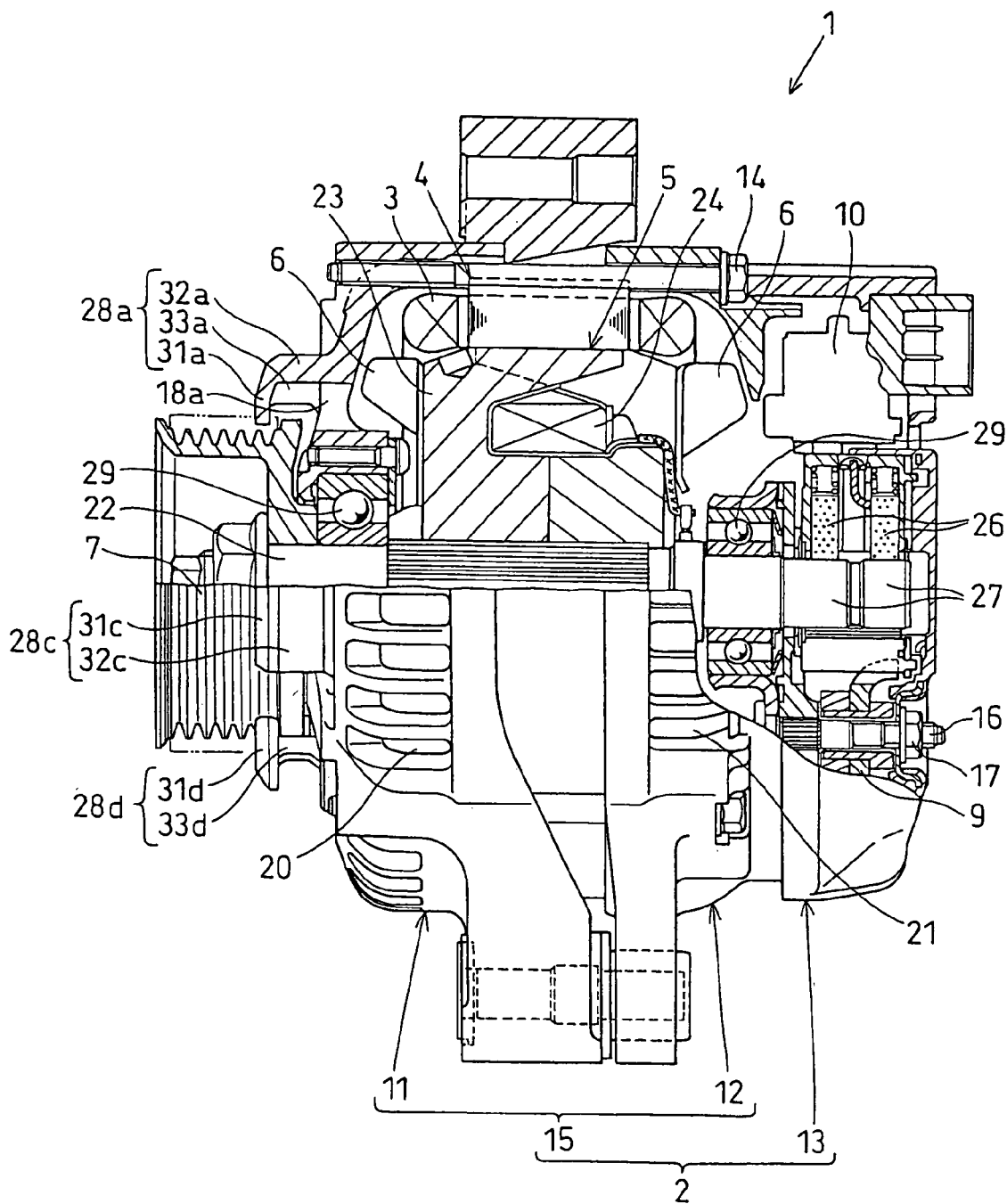
FIG. 1 is a partial cross-sectional view of an AC generator for a vehicle according to an exemplary embodiment of the present invention.

A preferred exemplary embodiment of the present invention will be described with reference to FIGS. 1–4. In this embodiment, a generator 1 (e.g., alternator) constructed according to the present invention is typically used for a vehicle, as an example. The generator 1 is driven by an engine of a vehicle to generate an electromotive force, so as to supply electrical power to electrical components mounted on the vehicle or to charge a vehicle battery using the electromotive force.

The generator 1 includes a case 2 for accommodating various generator components, a stator 4, a rotor 5, fans 6, a pulley 7, a belt 8, a commutator 9 and a regulator 10. The case 2 has opening portions through which outside air is circulated to an interior of the case 2 when the fans 6 are operated. The stator 4 is disposed in the case 1 coaxially with the case 1, and the rotor 5 is rotatably supported in the case 1 at an inner peripheral side of the stator 4. Armature coils 3 are wound on the stator 4, and AC electromagnetic force is induced in the armature coils 3 by rotation of the rotor 5. The pulley 7 is disposed outside the case 2, and is rotated coaxially with the rotor 5, and a rotation torque of a crank shaft is transmitted to the pulley 7 through the belt 8. The commutator 9 converts the AC electromagnetic force induced by the armature coils 3 to DC electromagnetic force, and the regulator 10 regulates a value of the DC electromagnetic force converted by the commutator 9 to a suitable value.

The case 2 includes a drive end frame 11, a rear end frame 12 and a rear cover 13, which are arranged in this order from one axial end toward the other axial end. The drive end frame 11 and the rear end frame 12 are fastened using through-bolts 14, so as to form an approximately cylindrical housing 15. The rear cover 13 is fastened to a rear end portion of the housing 15 using bolts 16 and nuts 17 to close a rear opening of the housing 15.

Figure 2:
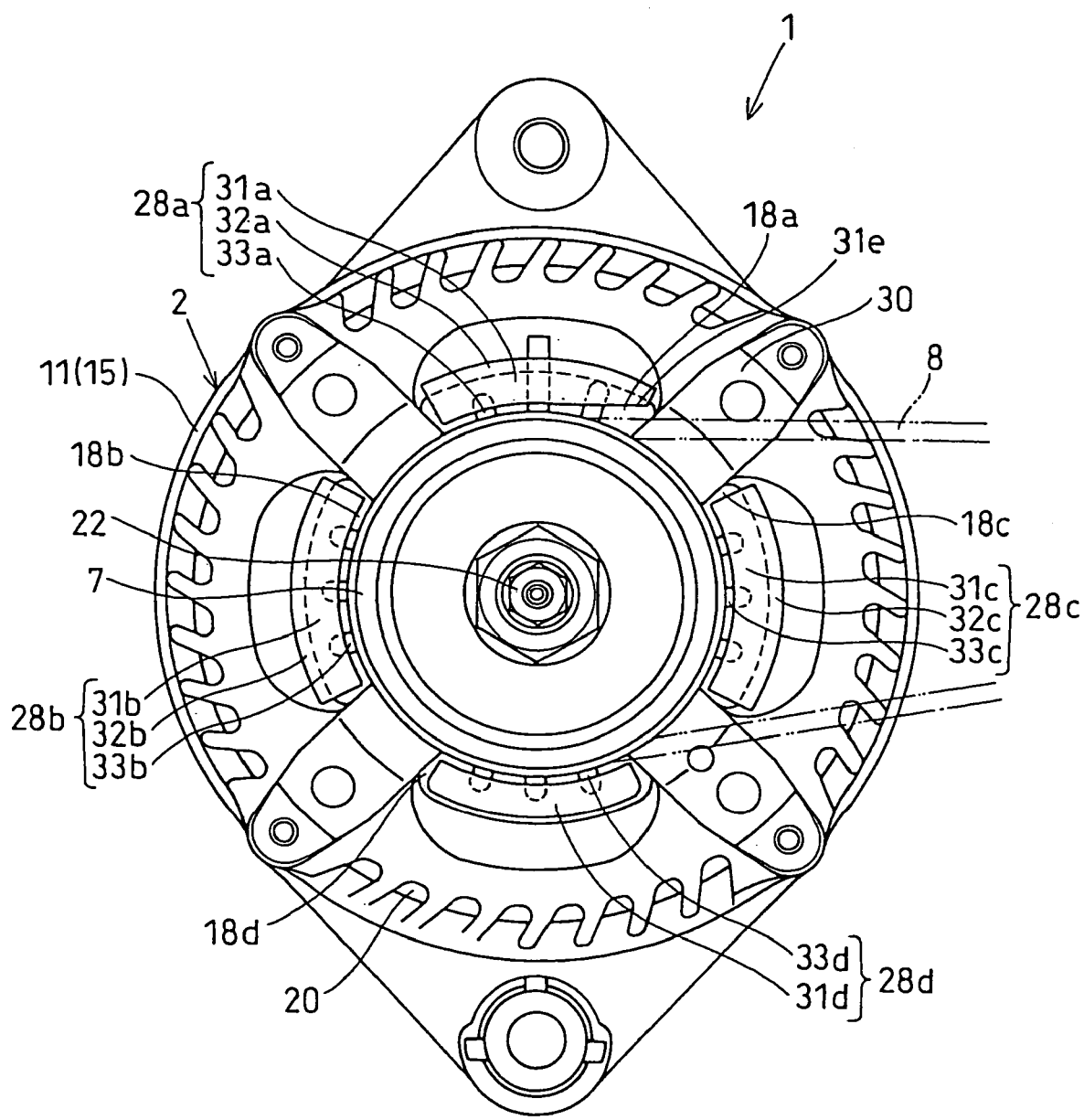
FIG. 2 is a front view of the generator shown in FIG. 1.

As shown in FIG. 2, four support ribs 30 extend in a radial direction, and are disposed at one end wall of the drive end frame 11 in the case 2, and four axial opening portions 18a, 18b, 18c, 18d each having an approximate fan shape are formed between the four support ribs 30, respectively. The four axial opening portions 18a, 18b, 18c, 18d are opened approximately in an axial direction at the one end wall of the drive end frame 11.

The four opening portions 18a, 18b, 18c, 18d are covered by respective cover portions 28a, 28b, 28c, 28d from an outside of the drive end frame 11, and a clearance is provided between each cover portion 28a, 28b, 28c, 28d and the drive end frame 11 at each of the axial opening portions 18a–18d. Each cover portion 28a, 28b, 28c, 28d covers part of the area of each opening portion 18a, 18b, 18c, 18d, and the covered area of each opening portion 18a, 18b, 18c, 18d is not smaller than 50 percent and is not larger than 90 percent of the total area of each opening portion 18a, 18b, 18c, 18d. That is, the covered area of each opening portion 18a, 18b, 18c, 18d is in a range between 50 percent and 90 percent of the total area of each opening portion 18a, 18b, 18c, 18d.

As shown in FIGS. 1 and 2, the cover portion 28a includes a peaked portion 31a, and support portions 32a, 33a for supporting the peaked portion 31a. The peaked portion 31a covers the axial opening portion 18a from an outer side of the drive end frame 11 so as to have a clearance with a peripheral portion of the axial opening portion 18a. Furthermore, as shown in FIG. 2, a part of the peaked portion 31a is removed at a removed portion 31e so that the peaked portion 31a is prevented from contacting the belt 8. The peaked portion 31a is an approximately fan-shaped plate. Because a part of the peaked portion 31a is removed to have the removed portion 31e, a clearance is formed between the peaked portion 31a and the belt 8. For example, the removed portion 31e is formed approximately parallel to the belt 8.

As shown in FIG. 1, the support portion 32a extends from an outer periphery of the axial opening portion 18a, and is connected to an outer periphery of the peaked portion 31a. The support portion 33a is formed to have three ribs extending from three positions of an inner periphery of the axial opening portion 18a to the peaked portion 31a, as shown in FIGS. 1 and 2. A center rib of the support portion 33a extends radially outward more that the support portion 32a.

As shown in FIG. 2, the cover portion 28b includes a peaked portion 31b, and support portions 32b, 33b for supporting the peaked portion 31b. The peaked portion 31b covers the axial opening portion 18b from an outer side of the drive end frame 11 so as to have a clearance with a peripheral portion of the axial opening portion 18b. The peaked portion 31b is an approximately fan-shaped plate. The support portion 32b extends from an outer periphery of the axial opening portion 18b, and is connected to an outer periphery of the peaked portion 31b. The support portion 33b is formed to have three ribs extending from three positions of an inner periphery of the axial opening portion 18b to the peaked portion 31b, as shown in FIG. 2.

Similar to the cover portion 28b, the cover portion 28c includes a peaked portion 31c, and support portions 32c, 33c for supporting the peaked portion 31c. The peaked portion 31c covers the axial opening portion 18c from an outer side of the drive end frame 11 so as to have a clearance with a peripheral portion of the axial opening portion 18c. The peaked portion 31c is an approximately fan-shaped plate. The support portion 32c extends from an outer periphery of the axial opening portion 18c, and is connected to an outer periphery of the peaked portion 31c. The support portion 33c is formed to have three ribs extending from three positions of an inner periphery of the axial opening portion 18c to the peaked portion 31c, as shown in FIG. 2.

As shown in FIGS. 1 and 2, the cover portion 28d includes a peaked portion 31d, and a support portion 33d for supporting the peaked portion 31d. The peaked portion 31d covers the axial opening portion 18d from an outer side of the drive end frame 11 so as to have a clearance with a peripheral portion of the axial opening portion 18d. The peaked portion 31d is an approximately fan-shaped plate. In the cover portion 28d, the peaked portion 31d is supported only by the support portion 33d. The support portion 33d is formed to have three ribs extending from three positions of an inner periphery of the axial opening portion 18d to the peaked portion 31d.

Figure 3:
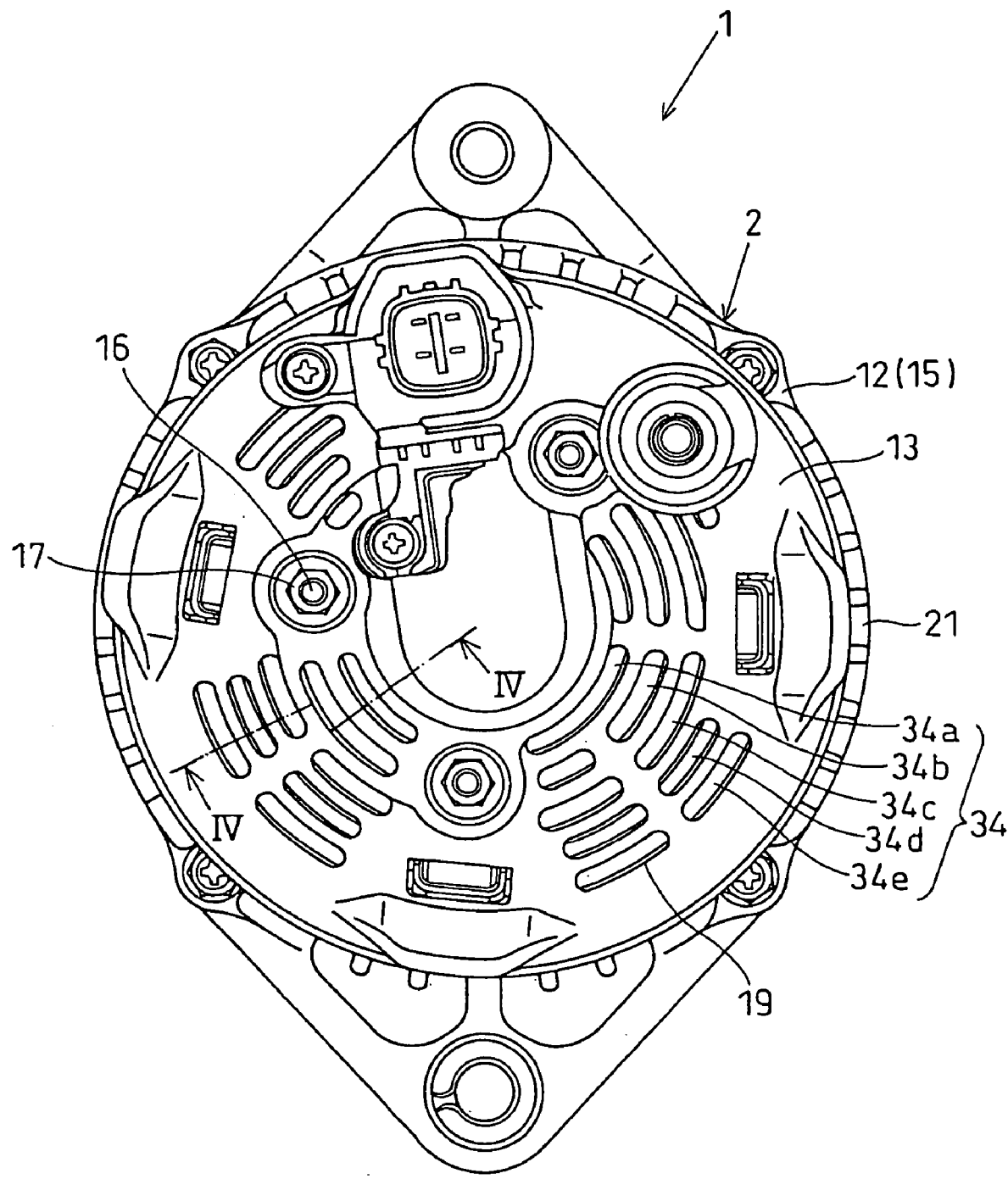
FIG. 3 is a back view of the generator shown in FIG. 1.

As shown in FIG. 3, the other end wall of the case 2 in the axial direction, that is, the end wall of the rear cover 13 is formed to have multiple slit opening portions 19. The slit opening portions 19 are formed into circular arc shapes arranged on multiple concentric circles. The axial opening portions 19 are opened approximately in the axial direction, and are covered by cover portions 34a –34e (collectively and individually referred to by numeral 34) from an outside of the rear cover 13. The cover portions 34 cover respective opening portions 19 to have clearances with peripheral portions of the axial opening portions 19. Specifically, the cover portion 34a covers the radially innermost positioned axial opening portions 19, the cover portion 34b covers the axial opening portions 19 that are adjacent to the cover portion 34a, and the cover portions 34c –34e cover the radial outside opening portions 19 in this order in the radially outward direction. Furthermore, the cover portions 34 cover the axial opening portions 19 such that a covered area of the axial opening portions 19 is not smaller than 50 percent and not larger than 90 percent of the total area of the axial opening portions 19. That is, the covered area of the axial opening portions 19 by the cover portions 34 is in a range between 50 percent and 90 percent of the total area of the axial opening portions 19.

Figure 4:
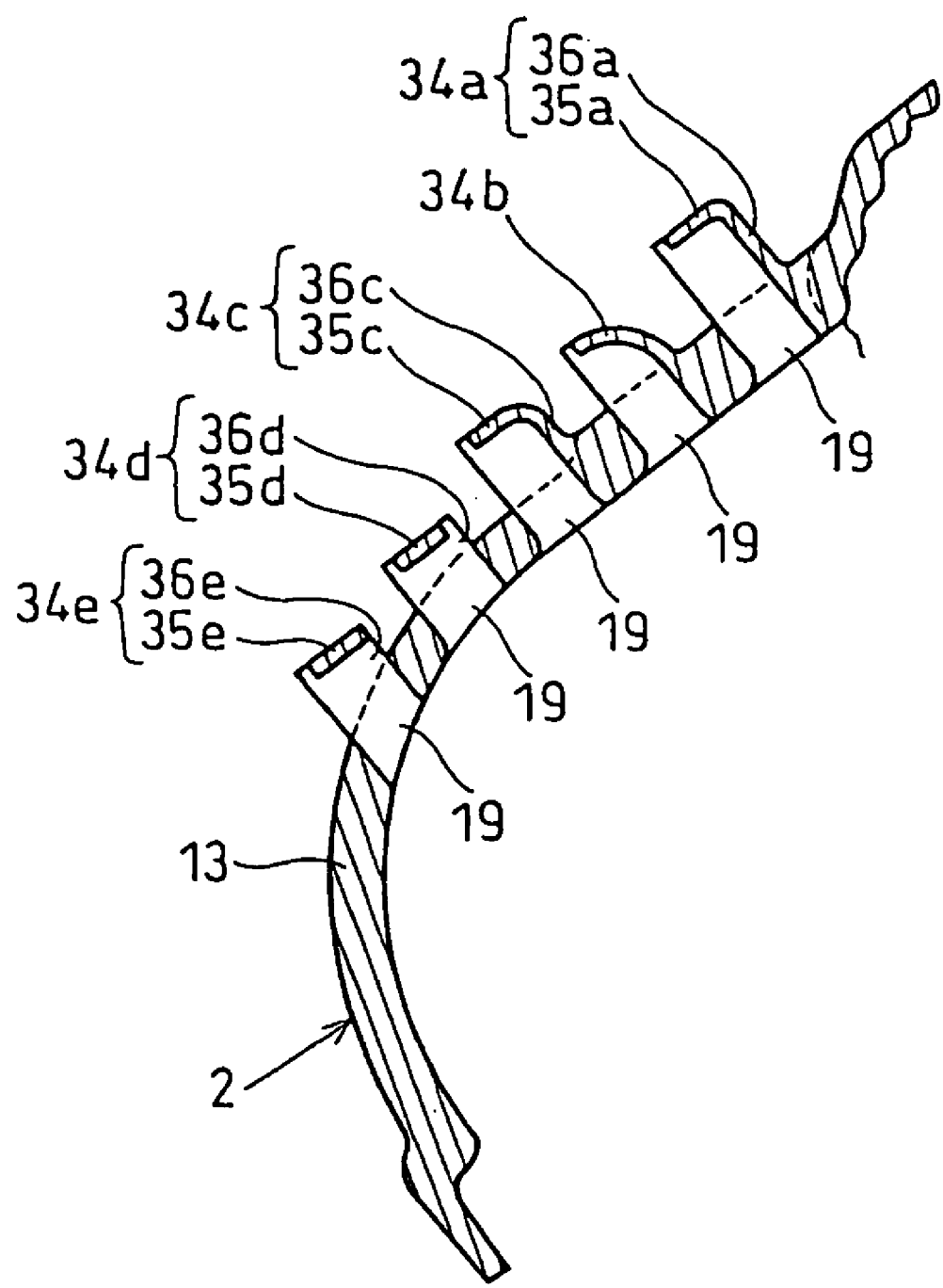
FIG. 4 is a cross-sectional view taken along line IV—IV in FIG. 3.

As shown in FIG. 4, the cover portions 34 have various shapes. For example, the cover portions 34a, 34c –34e include respective peaked portions 35a, 35c–35e which cover the axial opening portions 19 from an outside of the rear cover 13 while having clearances with the rear cover 13, and respective support portions 36a, 36c–36e. The peaked portions 35a, 35c –35e are circular arc-shaped plates having predetermined widths.

The support portions 36a, 36c of the peaked portions 35a, 35c extend from an inner periphery and two end peripheries of each opening portion 19, and are connected to the inner peripheries and the two end peripheries of the peaked portions 35a, 35c, respectively. The support portions 36d, 36e of the peaked portions 35d, 35e extend from two end peripheries of each opening portion 19, and are connected to the two end peripheries of the peaked portions 35d, 35e, respectively. Furthermore, as shown in FIG. 4, the peaked portion 35d does not cover end portions adjacent to the inner periphery and the outer periphery of the axial opening portion 19, and the peaked portion 35e does not cover an end portion adjacent to the outer periphery of the axial opening portion 19.

The cover portion 34b is bent smoothly, and thus does not clearly define a peaked portion and a support portion as in the cover portions 34a and 34c –34e. The cover portion 34b covers the axial opening portion 19 from the inner periphery and two end peripheries of the opening portion 19.

In this embodiment, the generator 1 is assembled to an engine compartment such that the axial opening portions 18a –18d or the axial opening portions 19 are opened upward.

Radial opening portions 20, which open approximately in radial directions, are formed in a peripheral side wall of the drive end frame 11 at a radial outside. Similarly, radial opening portions 21, which open approximately in radial directions, are formed in a peripheral side wall of the rear end frame 12 at a radial outside.

A rotation shaft 22 is disposed to protrude from the housing 15 and to be rotatably supported by a bearing portion 29.

Within the housing 15, the stator 4, the rotor 5 and the fans 6 are accommodated. First, the cylindrical stator 4 is coaxially fixed to an inner peripheral wall of the housing 15, and the rotor 5 is arranged at an inner peripheral side of the stator 4 coaxially with the stator 4. The fans 6 (e.g., two fans) are attached to two end surfaces of the rotor 5. The rotor 5 is attached to a middle portion of the rotation shaft 22 to be rotatably supported in the housing 15.

The stator 4 is provided with plural slots extending in the axial direction, and the armature coils 3 are wound through the slots in three phases. The rotor 5 includes plural claw-shaped magnetic pole cores 23, and plural field coils 24 disposed at inner peripheral sides of the pole cores 23. The field coils 24 are electrically connected to the vehicle battery and the regulator 10 through a connector. Accordingly, electrical power is supplied to the field coils 24, and three-phase AC electromagnetic force is induced in the armature coils 3 when the rotor 5 rotates.

Each of the fans 6 includes a circular base and plural blades disposed to extend from an outer periphery of the base. Each fan 6 is a centrifugal fan in which air is drawn from an axial direction of a center portion, and is blown radially outward. Each fan 6 rotates in accordance with a rotation of the rotor 5, so as to draw outside air from the axial opening portions 18a –18d, 19 and to discharge air from the radial opening portions 20, 21. Accordingly, outside air is circulated to the interior of the case 2, and cools the heat-generating members such as the armature coils 3, the field coils 24, the commutator 9 and the regulator 10. In this embodiment, one of the two fans 6 may include blades of an axial fan in which air is discharged in the axial direction. Further, only one centrifugal fan 6 may be disposed at one end side of the rotor 5.

The pulley 7 is attached to one end portion of the rotation shaft 22 at a position outside the one end wall of the housing 15, and the belt 8 is hung on the pulley 7. Therefore, when the rotation torque of the crank shaft is transmitted to the pulley 7 and the rotation shaft 22, the rotor 5 and the fans 6 are rotated. Slip rings 27 are arranged at the other end portion of the rotation shaft 22, and brushes 26 are disposed to contact the slip rings 27 and to slide on the slip rings 27. Electrical power is supplied to the field coils 24 through the brushes 26 and the slip rings 27.

According to this embodiment, the cover portions 28a –28d cover the axial opening portions 18a –18d from an outside of the drive end frame 11 with clearances. Further, the cover portions 34a –34e cover the axial opening portions 19 from an outside of the rear cover 13 with clearances.

When outside air is circulated to the interior of the generator 1 by the rotation of the fans 6, noise due to air flow is generated inside the generator 1 (i.e., inside the case 2). However, in this embodiment, because the cover portions 28a –28d and the cover portion 34a –34e are provided, the noise generated inside the generator 1 is reflected by the cover portions 28a –28d and the cover portions 34a –34e. Therefore, it is difficult for the noise generated inside the generator 1 to be transmitted to an exterior such as a passenger compartment, and unpleasant feeling, due to the noise, given to a passenger in the passenger compartment can be reduced.

The cover portions 28a –28d extend outward from the outer surface of the one end wall of the drive end frame 11, and the cover portions 34a –34e extend outward from the outer surface of the other end wall of the rear cover 13. Therefore, the cover portions 28a –28d can be formed integrally with the drive end frame 11, and the cover portions 34a –34e can be formed integrally with the rear cover 13. Accordingly, the number of components of the generator 1 is not increased, while it can restrict noise from being transmitted to the exterior of the case 2.

Furthermore, the cover portions 28a –28d cover a part of the axial opening portions 18a –18d so that the covered area of the axial opening portions 18a –18d is not smaller than 50 percent and not larger than 90 percent of the total area of the axial opening portions 18a –18d. Similarly, the cover portions 34a –34e cover a part of the axial opening portions 19 so that the covered area of the axial opening portions 19 is not smaller than 50 percent and not larger than 90 percent of the total area of the axial opening portions 19.

If the covered area of the axial opening portion 18a, covered by the cover portion 28a, is smaller than 50 percent, noise reflected by the cover portion 28a becomes smaller relative to the noise transmitted through the axial opening portion 18a. In this case, the noise generated at the interior of the case 2 of the generator 1 is easily transmitted to the exterior of the case 2 through the axial opening portion 18a. In contrast, if the covered area of the axial opening portion 18a, covered by the cover portion 28a, is larger than 90 percent of the area of the axial opening portion 18a, a suction amount of outside air through the axial opening portion 18a becomes smaller. In this case, cooling capacity due to the outside air circulation may become insufficient.

As described above, when the covered area of the axial opening portions 18a –18d covered by the cover portions 28a –28d is set in the range between 50–90 percent of the area of the axial opening portions 18a –18d, and the covered area of the axial opening portions 19 covered by the cover portions 34a –34e is set in the range between 50–90 percent of the area of the axial opening portions 19, the noise transmitted to the exterior of the case 2 can be effectively reduced while the cooling capacity due to the outside air circulation can be improved.

Furthermore, a part of the cover portion 28a is removed to have the removed portion 31e so that the belt 8 does not contact the cover portion 28a. Therefore, the belt 8 can be prevented from being stopped due to contact between the belt 8 and the cover portion 28a, and noise generated due to contact of the belt 8 with the cover portion 28a can be prevented.

Because the fan 6 is arranged at the one end of the rotation shaft 22, adjacent to the one end wall of the drive end frame 11, noise is easily transmitted to the axial opening portions 18a –18d. However, in this embodiment, because a part of the axial opening portions 18a –18d is covered, it can effectively reduce noise transmitted to the exterior of the case 2.

Furthermore, the commutator 9 and the regulator 10 are accommodated in the rear cover 13 to be cooled by outside air drawn through the axial opening portions 19 of the rear cover 13. No other heat-generating member is placed between the axial opening portions 19 and the commutator 9 and the regulator 10. Therefore, the commutator 9 and the regulator 10 can be sufficiently cooled by the cool air drawn from the axial opening portions 19.

(Other Embodiments)

Although the present invention has been described in connection with a preferred exemplary embodiment thereof with reference to the accompanying drawings, it is to be noted that various changes and modifications will become apparent to those skilled in the art.

For example, in the above-described embodiment, the axial opening portions 18a –18d are covered by the cover portions 28a –28d, and the axial opening portions 19 are covered by the cover portions 34a –34e. However, only one of the axial opening portions 18a –18d and the axial opening portions 19 may be covered by the cover portions 28a –28d or the cover portions 34a –34e. In this case, if the axial opening portions 18a –18d are covered by the cover portions 28a –28d, the generator 1 is mounted to the vehicle such that the axial opening portions 18a –18d are opened to the upper side. According to this arrangement, the noise is reflected by the cover portions 28a –28d at the axial opening portions 18a –18d opened upward, while the noise is transmitted from the axial opening portions 19 to the bottom side of the vehicle. Therefore, it is difficult for the noise to be transmitted to the passenger compartment from any of the axial opening portions 18a –18d and 19.

In the above-described embodiment, the present invention is applied to the generator 1 having only a generator function. However, the present invention can be applied to a motor generator having a motor function and a generator function.

Furthermore, in the above-described embodiment, the generator 1 is mounted to a vehicle. However, the generator 1 of the present invention can be used in other environments, and is not limited to use in a vehicle.

While the invention has been described with reference to exemplary embodiments thereof, it is to be understood that the invention is not limited to the exemplary embodiments and constructions. The invention is intended to cover various modification and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. A generator comprising:
   a case including two end walls in an axial direction and a peripheral side wall connected to the two end walls, wherein the case has a plurality of first opening portions which are provided in at least one of the two end walls and open approximately in the axial direction, and a plurality of second opening portions which are provided in the peripheral side wall and open approximately in a radial direction that is perpendicular to the axial direction;
   a stator disposed in the case coaxially with the axial direction of the case, the stator having an armature coil wound thereon;
   a rotor rotatably supported at an inner peripheral side of the stator;
   a housing which accommodates the rotor;
   a commutator which converts AC electromagnetic force induced in the armature coil to DC electromagnetic force, wherein the commutator is located adjacent to the housing and is covered by the case;
   a fan disposed at one axial end portion of the rotor and rotating together with the rotor to draw outside air outside the case through the first opening portions and to discharge the drawn outside air through the second opening portions; and
   a cover member which covers at least part of the first opening portions from an outside of the case with clearances between the cover member and the case.

2. The generator according to claim 1, further comprising:
   an another fan disposed at an other axial end portion of the rotor and rotating together with the rotor to draw outside air through the first opening portions and to discharge the drawn outside air through the second opening portions, wherein the first opening portions are provided in both of the two end walls and open approximately in the axial direction.

3. The generator according to claim 1, wherein the cover member extends from an outer surface of the case in an outward direction and is spaced from the outer surface to partially cover the first opening portions.

4. The generator according to claim 1, wherein the cover member includes a plurality of cover portions each of which is arranged to cover at least one of the first opening portions.

5. The generator according to claim 1, wherein the cover member covers the first opening portions with a covered area that is not smaller than 50 percent and is not larger than 90 percent of a total area of the first opening portions.

6. The generator according to claim 5, wherein,
in each of the first opening portions, the covered area is not smaller than 50 percent and is not larger than 90 percent of the total area of each first opening portion.

7. The generator according to claim 1, wherein:
each of the first opening portions approximately has a fan shape; and
the first opening portions are arranged in one end wall of the case concentrically in one circle.

8. The generator according to claim 1, wherein:
each of the first opening portions has approximately a circular arc shape; and
the first opening portions are arranged in one end wall of the case concentrically in plural concentric circles.

9. The generator according to claim 1, wherein the generator is mountable to a vehicle such that the first opening portions provided at one end wall of the case are opened in an upward direction.

10. A method of mounting the generator of claim 1 to a vehicle, the method comprising:
attaching the case of the generator to the vehicle such that the first opening portions are opened in an upward direction.

11. A method of mounting the generator of claim 1 to a vehicle, the method comprising:
attaching the case of the generator to the vehicle such that the axial direction is positioned in a vertical direction.

12. The generator according to claim 1, wherein the commutator is located outside the housing in the axial direction and is accommodated in the case.

13. The generator according to claim 1, wherein the fan draws the outside air directly from outside the case through the first opening portions.

14. The generator according to claim 13, wherein the outside air drawn into the case through the first opening portions passes over the commutator after passing through the first opening portions.

15. The generator according to claim 12, wherein the outside air drawn into the case through the first opening portions passes over the commutator after passing through the first opening portions.

16. The generator according to claim 1, wherein the outside air drawn into the case through the first opening portions passes over the commutator after passing through the first opening portions.

17. A generator comprising:
a case including two end walls in an axial direction and a peripheral side wall connected to the two end walls, wherein the case has a plurality of first opening portions which are provided in at least one of the two end walls and open approximately in the axial direction, and a plurality of second opening portions which are provided in the peripheral side wall and open approximately in a radial direction that is perpendicular to the axial direction;
a stator disposed in the case coaxially with the axial direction of the case, the stator having an armature coil wound thereon;
a rotor rotatably supported at an inner peripheral side of the stator;
a fan disposed at one axial end portion of the rotor and rotating together with the rotor to draw outside air through the first opening portions and to discharge the drawn outside air through the second opening portions; and
a cover member which covers the first opening portions from an outside of the case with clearances between the cover member and the case, wherein the cover member includes a plurality of cover portions each of which is arranged to cover at least one of the first opening portions, and wherein each of the cover portions extends outwardly from the end wall of the case and is bent to cover at least one of the first opening portions with the clearance.

18. A generator comprising:
a case including two end walls in an axial direction and a peripheral side wall connected to the two end walls, wherein the case has a plurality of first opening portions which are provided in at least one of the two end walls and open approximately in the axial direction, and a plurality of second opening portions which are provided in the peripheral side wall and open approximately in a radial direction that is perpendicular to the axial direction;
a stator disposed in the case coaxially with the axial direction of the case, the stator having an armature coil wound thereon;
a rotor rotatably supported at an inner peripheral side of the stator;
a fan disposed at one axial end portion of the rotor and rotating together with the rotor to draw outside air through the first opening portions and to discharge the drawn outside air through the second opening portions;
a cover member which covers the first opening portions from an outside of the case with clearances between the cover member and the case;
a pulley which is disposed outside of one of the two end walls of the case and is rotatable coaxially with the rotor at one end of the rotor; and
a belt through which a rotation torque of a crank shaft is transmitted to the pulley,
wherein the cover member arranged at a side of the one end wall of the case has a removed portion that is removed to prevent contact with the belt.

19. The generator according to claim 18, further comprising:
a commutator which converts AC electromagnetic force induced in the armature coil to DC electromagnetic force; and
a regulator which controls the DC electromagnetic force converted by the commutator to a desired value,
wherein the commutator and the regulator are arranged inside the case at the other end of the rotor so as to be cooled by outside air drawn through the first opening portions of the other end wall of the case.

* * * * *